J. GLEESON & J. H. ROBINSON.
SPRING SEAT.
APPLICATION FILED JUNE 2, 1917.
1,283,152.
Patented Oct. 29, 1918.
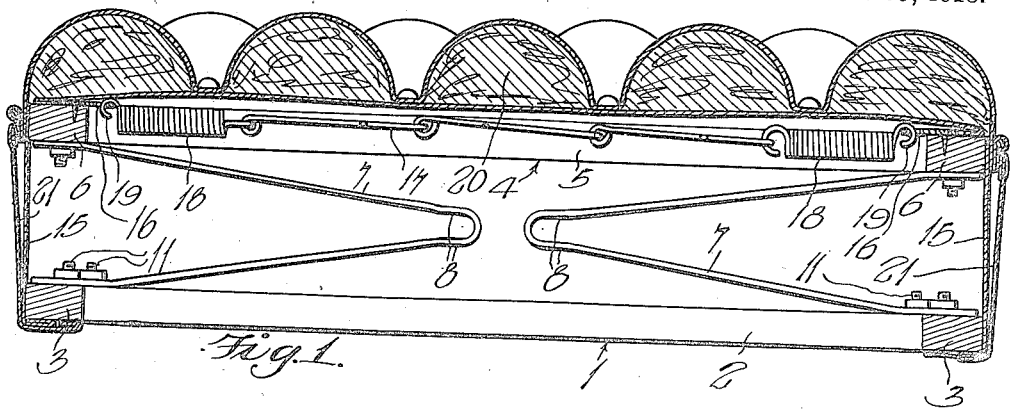
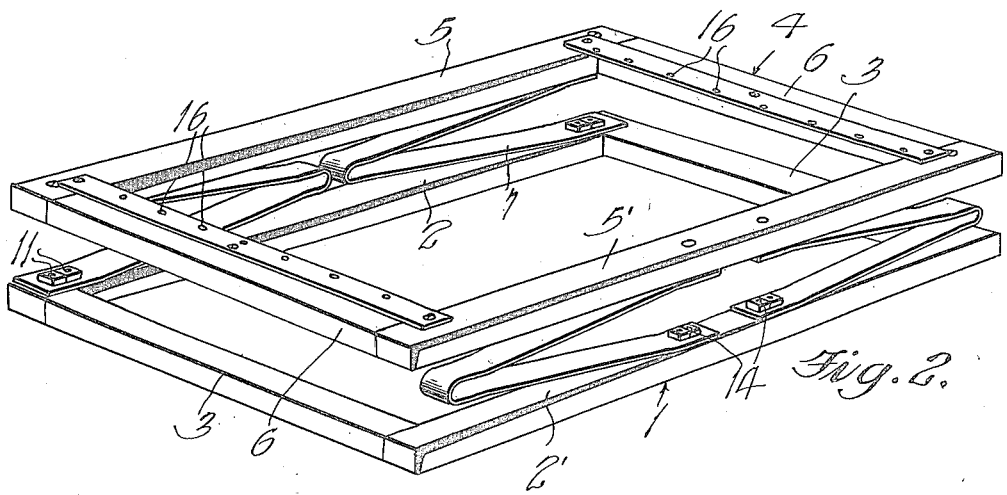
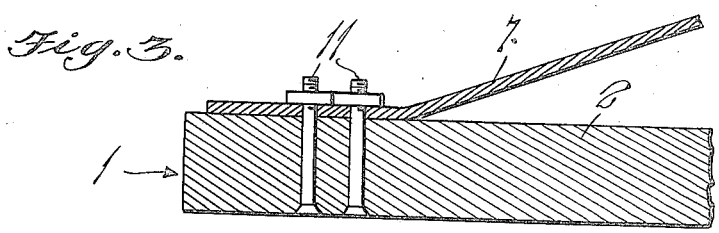
Witness
H. Woodard
Inventors
J. H. Robinson
& J. Gleeson
By H. B. Willson & Co.
Attorneys

UNITED STATES PATENT OFFICE.

JOHN GLEESON AND JAMES H. ROBINSON, OF CHICAGO, ILLINOIS, ASSIGNORS OF ONE-THIRD TO NATHAN RUDOY, OF CHICAGO, ILLINOIS.

SPRING-SEAT.

1,283,152. Specification of Letters Patent. Patented Oct. 29, 1918.

Application filed June 2, 1917. Serial No. 172,542.

*To all whom it may concern:*

Be it known that we, JOHN GLEESON and JAMES H. ROBINSON, citizens of the United States, residing at Chicago, in the county of Cook and State of Illinois, have invented certain new and useful Improvements in Spring-Seats; and we do declare the following to be a full, clear, and exact description of the invention, such as will enable others skilled in the art to which it appertains to make and use the same.

This invention relates to improvements in spring seats and more particularly to that type of seat including an upholstered cushion and adapted for use in automobiles and other vehicles.

The object of the invention is to provide a seat of extremely simple construction and at the same time efficient and durable and one which will provide ease and comfort to persons riding in vehicles equipped with such seats.

A further object is to so arrange the front and rear sets of springs relative to one another that they combine to minimize the vibrations resulting from motions of the vehicle in which a seat of this kind is used.

With these and numerous other objects in view our invention resides in the novel features of construction and the combination and arrangement of the several parts as will be set forth in the specification and claim and clearly illustrated in the accompanying drawings in which:—

Figure 1 is a vertical longitudinal section of the seat;

Fig. 2 is a perspective view of the base and seat frames;

Fig. 3 is a detail sectional view of the spring fastening means.

The present embodiment of our invention includes an open base frame 1 preferably rectangular and comprising a pair of longitudinal front and rear bars 2 and 2' respectively and end bars 3 formed from any suitable material, said bars being connected in any desired manner.

Disposed above the base frame 1 in vertical alinement therewith is an open seat frame 4 which includes a pair of longitudinal front and rear bars 5 and 5' respectively and end bars 6. Said frames are secured together by means of springs 7 which will be hereinafter referred to as wish-bone springs in view of the fact that their shape resembles that of a wish-bone. Each wish-bone spring is formed from a flat strip of spring metal which is bent upon itself, the short arms 8 extending parallel with each other for a short distance and then diverging toward the longitudinal front and rear bars of said frames and then extending longitudinally in parallel relation with each other to provide means for attachment to said bars.

In connecting the front longitudinal bars 2 and 5 of the base and seat frames respectively, the wish-bone springs are disposed longitudinally of said bars and have their free ends extending outwardly in opposite directions, said ends being provided with apertures alined with apertures in said bars to receive bolts or the like 11 as clearly illustrated in Fig. 3 of the drawings.

The rear longitudinal bars 2' and 5' of the base and seat frames are connected by wish-bone springs 7 which are arranged differently from those just described in that the free ends are directed toward each other, said ends having apertures to aline with apertures in rear bars 2' and 5' and which are adapted to receive bolts 14 to secure them together. In connecting the ends of the springs 7 to the longitudinal bars of the base frame I preferably employ two spaced bolts for the purpose of preventing relative movement of said springs and bars.

Because of the reverse arrangement of the front and rear pairs of springs as shown by the foregoing, any series of vibrations that would tend to be multiplied in one set of springs is off-set by the opposing action of the oppositely disposed set of springs.

For the purpose of limiting the distance of separation of the two frames a flexible strip 15 of any suitable material is adapted to have its upper and lower edges fastened in any desired manner to the side and end bars of said frames. It is to be understood that this flexible strip may or may not extend entirely around the seat.

Disposed transversely of the end bars of the seat frame is a pair of flat metal plates which are secured to said bars by means of screws or the like and which are adapted to project inwardly beyond the inner edges of said end bars, said inwardly projecting portions being provided with rows of apertures 16 for a purpose to be described. A wire spring fabric 17 is disposed in said seat frame and includes coil springs 18 having hooks 19 on their outer ends adapted to be engaged with the apertures 16 on said plates, said fabric serving as a support for an ordinary cushion 20. In order to give the seat a neat appearance and also aid the flexible strips between the frame to perform their functions the cushion may be provided with flaps 21 which extend downwardly and are folded over the lower edge of the base frame and tacked thereto.

From the foregoing description taken in connection with the accompanying drawings the construction and operation of our improved spring seats will be readily understood but it is also to be understood that within the scope of the appended claim numerous changes may be made without sacrificing the principal advantages.

We claim:

A spring seat comprising a base frame, a seat frame arranged above said base frame, a pair of wish-bone springs disposed between said frames and having their ends directed toward each other and secured to the middle of the front part of each of said frames and a second pair of wish-bone springs, said second pair being disposed between said frames at the rear of the latter and having their arms extending outwardly in opposite directions and secured to each of said frames at points adjacent the ends of the latter, substantially as described, for the purpose specified.

In testimony whereof we have hereunto set our hands in the presence of two subscribing witnesses.

JOHN GLEESON.
JAMES H. ROBINSON.

Witnesses:
EDGAR B. ELDER,
NATHAN K. RUDOY.